US010945046B2

(12) United States Patent
James

(10) Patent No.: US 10,945,046 B2
(45) Date of Patent: *Mar. 9, 2021

(54) SYSTEMS AND METHODS FOR GENERATING FOR DISPLAY RECOMMENDATIONS THAT ARE TEMPORALLY RELEVANT TO ACTIVITIES OF A USER AND ARE CONTEXTUALLY RELEVANT TO A PORTION OF A MEDIA ASSET THAT THE USER IS CONSUMING

(71) Applicant: Rovi Guides, Inc., San Jose, CA (US)

(72) Inventor: Bryan Keith James, Foster City, CA (US)

(73) Assignee: Rovi Guides, Inc., San Jose, CA (US)

(*) Notice: Subject to any disclaimer, the term of this patent is extended or adjusted under 35 U.S.C. 154(b) by 46 days.

This patent is subject to a terminal disclaimer.

(21) Appl. No.: 16/122,154

(22) Filed: Sep. 5, 2018

(65) Prior Publication Data
US 2019/0020926 A1 Jan. 17, 2019

Related U.S. Application Data

(63) Continuation of application No. 15/356,840, filed on Nov. 21, 2016, now Pat. No. 10,097,898.

(51) Int. Cl.
*H04N 21/482* (2011.01)
*H04N 21/2668* (2011.01)
(Continued)

(52) U.S. Cl.
CPC .......... *H04N 21/4826* (2013.01); *G06F 3/14* (2013.01); *G06F 16/437* (2019.01);
(Continued)

(58) Field of Classification Search
CPC ............ H04N 21/4826; H04N 21/458; H04N 21/2668; H04N 21/26283; H04N 21/4312;
(Continued)

(56) References Cited

U.S. PATENT DOCUMENTS 6,239,794 B1  5/2001  Yuen et al.
6,388,714 B1  5/2002  Schein et al.
(Continued)

FOREIGN PATENT DOCUMENTS

EP  1662817  5/2006

*Primary Examiner* — Hai V Tran
(74) *Attorney, Agent, or Firm* — Haley Guiliano LLP

(57) ABSTRACT

Systems and methods are provided herein for displaying recommendations that are temporally relevant to activities of a user and are contextually relevant to a portion of viewed media. This may be accomplished by a media guidance application identifying activities a user has planned, as well as respective times for which each of the plurality of activities was planned to be performed by the user. The media guidance application may filter the activities by determining which of the first plurality of activities has a corresponding respective time that is within a threshold period of time. The media guidance application may then identify characteristics of each filtered activity and of a media asset that the user is consuming at the present moment, and may compute whether the characteristics match. If the characteristics match, the media guidance application may generate for display a recommendation relating to the respective activity.

18 Claims, 6 Drawing Sheets

(51) Int. Cl.
    *H04N 21/458*    (2011.01)
    *G06Q 30/02*     (2012.01)
    *H04N 21/262*    (2011.01)
    *H04N 21/431*    (2011.01)
    *H04N 21/45*     (2011.01)
    *H04N 21/466*    (2011.01)
    *G06F 16/435*    (2019.01)
    *G06F 16/438*    (2019.01)
    *G06F 16/48*     (2019.01)
    *G06F 16/9032*   (2019.01)
    *G06F 3/14*      (2006.01)

(52) U.S. Cl.
    CPC .......... *G06F 16/438* (2019.01); *G06F 16/489* (2019.01); *G06F 16/90324* (2019.01); *G06Q 30/0252* (2013.01); *G06Q 30/0264* (2013.01); *G06Q 30/0271* (2013.01); *H04N 21/2668* (2013.01); *H04N 21/26283* (2013.01); *H04N 21/4312* (2013.01); *H04N 21/458* (2013.01); *H04N 21/4532* (2013.01); *H04N 21/4668* (2013.01); *H04N 21/4821* (2013.01)

(58) Field of Classification Search
    CPC .......... H04N 21/4532; H04N 21/4668; H04N 21/4821; G06F 16/90324; G06F 16/438; G06F 16/437; G06F 16/489; G06F 3/14; G06Q 30/0264; G06Q 30/0271; G06Q 30/0252
    See application file for complete search history.

(56) References Cited

U.S. PATENT DOCUMENTS

| | | |
|---|---|---|
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 9,420,319 B1* | 8/2016 | Story, Jr. ............ H04N 21/4668 |
| 2002/0174430 A1 | 11/2002 | Ellis et al. |
| 2003/0110499 A1 | 6/2003 | Knudson et al. |
| 2005/0102696 A1 | 5/2005 | Westberg |
| 2005/0108091 A1 | 5/2005 | Sotak et al. |
| 2005/0251827 A1 | 11/2005 | Ellis et al. |
| 2005/0283800 A1 | 12/2005 | Ellis et al. |
| 2006/0167747 A1 | 7/2006 | Goodman et al. |
| 2007/0156521 A1 | 7/2007 | Yates |
| 2008/0184301 A1 | 7/2008 | Boylan et al. |
| 2008/0301737 A1 | 12/2008 | Hjelmeland Almas et al. |
| 2010/0153885 A1 | 6/2010 | Yates |
| 2011/0283322 A1 | 11/2011 | Royce |
| 2013/0170813 A1 | 7/2013 | Woods et al. |
| 2014/0157295 A1 | 6/2014 | Jagtiani et al. |
| 2015/0052554 A1* | 2/2015 | Iyengar ............ G06Q 30/0205 725/35 |
| 2015/0066970 A1* | 3/2015 | Guzman ............ G06F 16/284 707/758 |
| 2015/0095329 A1* | 4/2015 | Sanio ............ G06F 16/48 707/732 |
| 2015/0172773 A1 | 6/2015 | Klappert et al. |
| 2015/0248651 A1* | 9/2015 | Akutagawa ........ G06Q 10/1095 705/7.19 |
| 2015/0254733 A1 | 9/2015 | Wu et al. |
| 2016/0035347 A1 | 2/2016 | Agarwal et al. |
| 2016/0092447 A1 | 3/2016 | Venkataraman et al. |
| 2016/0094889 A1 | 3/2016 | Venkataraman et al. |
| 2016/0142783 A1 | 5/2016 | Bagga et al. |
| 2016/0274744 A1 | 9/2016 | Neumann et al. |
| 2017/0195731 A1* | 7/2017 | Girlando ............ H04N 21/4668 |
| 2017/0300511 A1* | 10/2017 | Brewington ............ G06F 16/29 |

* cited by examiner

US 10,945,046 B2

SYSTEMS AND METHODS FOR GENERATING FOR DISPLAY RECOMMENDATIONS THAT ARE TEMPORALLY RELEVANT TO ACTIVITIES OF A USER AND ARE CONTEXTUALLY RELEVANT TO A PORTION OF A MEDIA ASSET THAT THE USER IS CONSUMING

CROSS-REFERENCE TO RELATED APPLICATIONS

This application is a continuation of U.S. patent application Ser. No. 15/356,840, filed Nov. 21, 2016, currently allowed, the disclosure of which is hereby incorporated by reference herein in its entirety.

BACKGROUND

When a user plans activities, such as a travel itinerary, the user is often provided recommendations about those activities as a user navigates through media. For example, when a user browses a web page, or views online programming, the related art describes targeting recommendations to the user that relate to activities that the user has recently planned or purchased reservations for. However, these recommendations often have no nexus to the media through which the user is navigating, and thus may go ignored, or may be perceived as an annoyance.

SUMMARY

Systems and methods are provided herein for generating for display recommendations that are temporally relevant to activities of a user and are contextually relevant to a portion of a media asset that the user is consuming. For example, if the user has an itinerary indicating he will travel to Italy in a week, and the user is presently watching a movie scene taking place in Rome, Italy, the user may be provided a recommendation relating to Italy at that time because the movie scene has a nexus to the user's upcoming travel plans.

In some aspects of the disclosure, a media guidance application may identify a first plurality of activities a user has planned, as well as a plurality of respective times for which each of the first plurality of activities was planned to be performed by the user. The media guidance application may identify this information by querying a non-media guidance application, such as an application dedicated to booking travel activities (e.g., Kayak, which is a service for booking car, hotel, and airline reservations).

In some embodiments, in order to identify the activities, the media guidance application may identify a plurality of non-media guidance applications that are associated with the user. For example, the user may use multiple applications that are dedicated to booking travel activities (for example, in addition to Kayak, the user may use an airline-specific application for booking a flight). The media guidance application may query each non-media guidance application of the plurality of non-media guidance applications for information relating to activities the user has planned, and may receive, in response to the querying, information about an activity of the activities the user has planned. The media guidance application may add the information to the first plurality of activities. Thus, the media guidance application may add the information from each non-media guidance application used by the user to schedule activities.

In some embodiments, the media guidance application may filter, from the first plurality of activities, a second plurality of activities (e.g., activities that are upcoming in the near future). The media guidance application may perform this filtering by determining which of the first plurality of activities has a corresponding respective time of the plurality of respective times that is within a threshold period of time of a present moment, and by adding each such activity to the second plurality of activities. For example, the media guidance application may determine which activities (e.g., travel plans) are coming up in the next day, week, and/or month.

In some embodiments, the media guidance application, when performing the filtering operation, may determine the threshold period of time by querying a database. The media guidance application may then access respective information relating to each respective activity of the first plurality of activities, and, for each respective information corresponding to each respective activity of the first plurality of activities, may access information relating to a respective time at which the respective activity is planned to be performed by the user. Thus, the media guidance application may learn each time at which each activity is planned to be performed. The media guidance application may compare each respective time at which the respective activity is planned to be performed by the user to the threshold period of time, and, in response to determining that the respective time at which the respective activity is planned is within the threshold period of time, the media guidance application may add the respective activity to the second plurality of activities.

In some embodiments, the media guidance application may, when querying the database for a threshold, query the database to determine a plurality of threshold periods of time, where each threshold period of time corresponds to a different type of activity. For example, if a user booked a trip to Rome, Italy for three months from now, that trip may be something the user is very excited about because it is a long-distance vacation. However, if the user planned to play tennis three months from now, that activity may not be so exciting because tennis is an activity that the user performs on an ongoing basis. Thus, different thresholds may apply to different types of activities (e.g., travel versus sports) when deciding whether to provide a recommendation relating to those activities). Thus, the media guidance application may, for each respective information corresponding to each respective activity of the first plurality of activities, access information relating to a respective type of activity of the respective activity, and, when comparing each respective time at which the respective activity is planned to be performed by the user to the threshold period of time comprises, the media guidance application may determine a respective type of activity of the respective activity, identify a respective threshold period of time of the plurality of threshold periods of time that corresponds to the respective type of activity of the respective activity, and compare the respective time at which the respective activity is planned to be performed by the user to the respective threshold period of time.

In some embodiments, the media guidance application may identify characteristics of each activity of the second plurality of activities. For example, if the user booked travel to Rome, Italy (which is in Europe), and plans to visit the Roman Colosseum (which is an ancient Roman ruin), and to go sky diving (which is an adventure sport), some characteristics of this activity may be: (1) Italy, (2) Rome, (3) Europe, (4) Colosseum, (5) Ruins, (6) Sky Diving, and (7) Adventure Sports.

Similar to identifying the characteristics of the activities, the media guidance application may identify characteristics of a portion of a media asset that the user is consuming at the present moment, such as a present frame of a movie, or a present scene. For example, if a present frame of a movie depicts actor Robert De Niro sky diving, and occurs in Europe, some characteristics may be (1) Robert De Niro, (2) Sky Diving, and (3) Europe.

In some embodiments, the media guidance application may compute, for each activity of the second plurality of activities, whether the respective characteristics of each respective activity are relevant to the portion of the media asset based on a comparison between the respective characteristics and the characteristics of the portion of the media asset. To perform this computation, the media guidance application may determine, for each respective activity, a respective amount of respective characteristics that match the characteristics of the portion of the media asset. The media guidance application may then compare each respective amount to a threshold, and may determine, based on comparing each respective amount to the threshold, that a respective characteristic has a respective amount that exceeds the threshold. In response to determining that the respective characteristic has a respective amount that exceeds the threshold, the media guidance application may determine that the respective characteristics for the respective activity to which the respective characteristics correspond are relevant to the portion of the media asset. Thus, activities with a sufficient number of characteristics that match characteristics of a portion of a media asset will be deemed relevant to the portion of the media asset.

In some embodiments, when comparing each respective amount to a threshold, the media guidance application may determine a plurality of thresholds, where each threshold of the plurality of thresholds corresponds to a respective activity of the second plurality of activities. The media guidance application may then compare each respective amount that corresponds to a respective activity to a threshold of the plurality of thresholds that corresponds to the respective activity. For example, a user profile may reflect that a user rarely travels to Italy, but often plays tennis. Thus, the threshold for providing recommendations for Italy when the user has a trip planned for Italy may be lower than a threshold for playing tennis.

In some embodiments, in response to determining that the respective characteristics for a respective activity are relevant to the portion of the media asset, the media guidance application may generate for display a recommendation relating to the respective activity. For example, when generating for display the recommendation, the media guidance application may determine which characteristics of the respective characteristics for the respective activity are relevant to the portion of the media asset, and may access a plurality of candidate recommendations. The media guidance application may then compare the characteristics of the respective activity that are relevant to the portion of the media asset to characteristics corresponding to each candidate recommendation of the plurality of candidate recommendations. The media guidance application may determine, based on comparing the characteristics of the respective activity that are relevant to the portion of the media asset to characteristics corresponding to each candidate recommendation of the plurality of candidate recommendations, a candidate recommendation that best matches the respective activity, and may generate for display the candidate recommendation.

In some embodiments, the media guidance application, when determining which characteristics of the respective characteristics for the respective activity are relevant to the portion of the media asset, may determine which characteristics of the respective characteristics for the respective activity match the characteristics of the portion of the media asset.

In some embodiments, the media guidance application may determine that a plurality of respective activities have respective characteristics that are relevant to the portion of the media asset. The media guidance application may rank each activity of the plurality of respective activities based on how relevant each activity is with respect to the portion of the media asset. When the media guidance application generates for display the recommendation relating to the respective activity, the media guidance application may generate for display a recommendation for a highest ranked activity.

In some embodiments, the media guidance application, when ranking each activity of the plurality of respective activities based on how relevant the each activity is respect to the portion of the media asset, may rank each activity based on an amount of characteristics corresponding to each activity that match the characteristics of the portion of the media asset.

In some embodiments, the media guidance application may identify activities a user has planned that are within a threshold period of time of a present moment. The media guidance application may identify characteristics of each of the activities and may also identify characteristics of a portion of a media asset that the user is consuming at the present moment. The media guidance application may determine, based on a comparison of the characteristics of each of the activities to the characteristics of the portion of the media asset, that an activity is relevant to the portion of the media asset, and may generate for display a recommendation relating to the activity that is relevant to the portion of the media asset.

DETAILED DESCRIPTION

Figure 1:
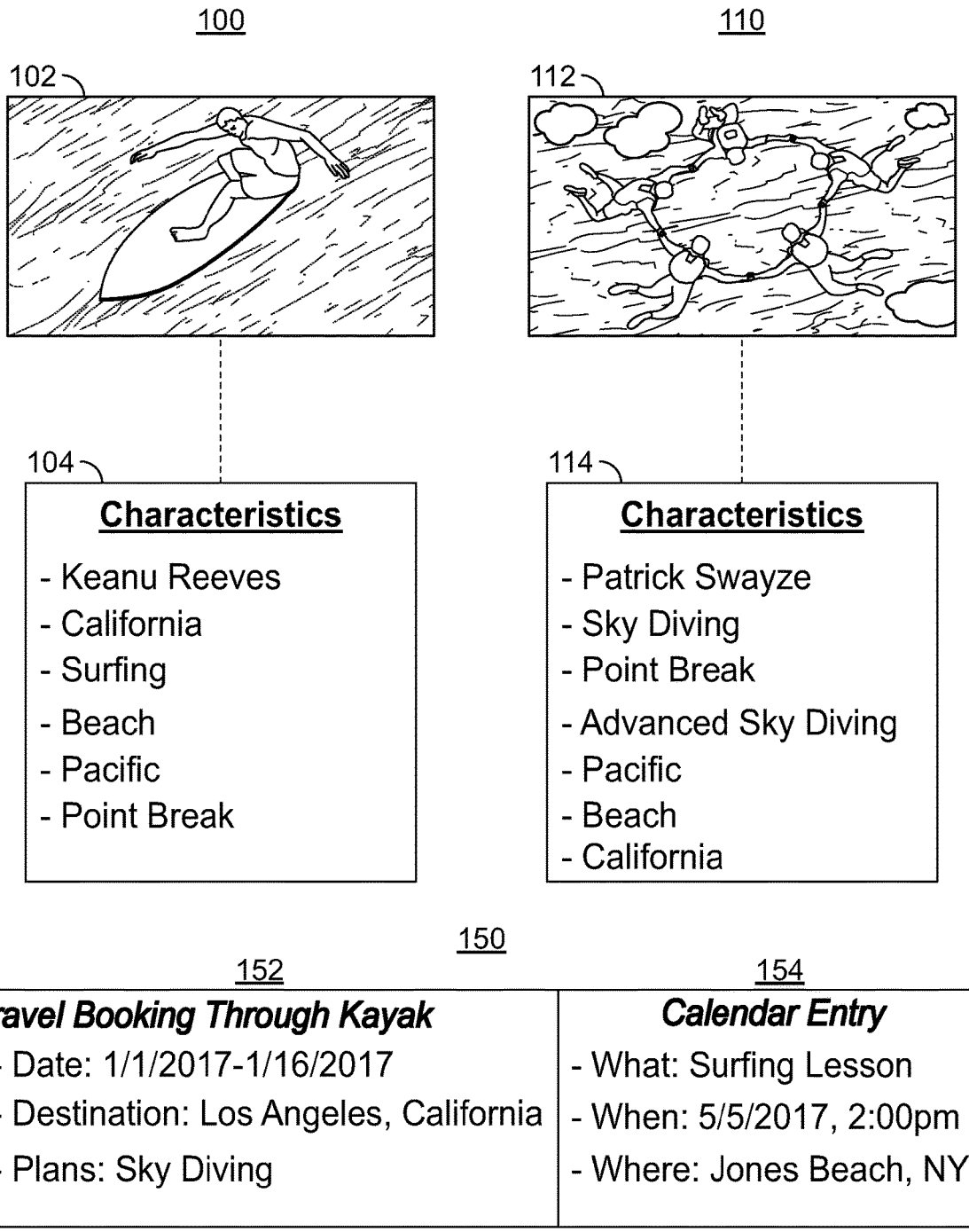
FIG. 1 depicts an illustrative embodiment of characteristics relating to various portion of a media asset, as well as characteristics of planned activities of a user, in accordance with some embodiments of the disclosure.

FIG. 1 depicts an illustrative embodiment of characteristics relating to various portion of a media asset, as well as characteristics of planned activities of a user, in accordance with some embodiments of the disclosure. FIG. 1 depicts user equipment 100 and user equipment 110, which are each generating for display portions of a media asset, where user equipment 100 is generating for display portion 102, and user equipment 110 is generating for display portion 112. User equipment 100 and user equipment 110 may be the same user equipment, but shown at different points in time. As used herein, a "portion of a media asset" (also referred to herein as a "portion") is defined to mean any segment of a media asset. When the media asset includes video, the portion may refer to a single video frame, a scene, a user-defined or editor-defined portion, or any other discrete segment of the video. Where the media asset includes audio, the portion may refer to a space between two conceptual boundaries (i.e., where a topic shifts from one topic to another), a sentence, a discrete period of time, or any other segment of the audio.

Each portion of a media asset may have associated characteristics. For example, portion 102 is associated with characteristics 104, and portion 112 is associated with characteristics 114. The term "characteristics," as used herein, refers to any attribute relating to a portion. For example, a characteristic may be anything relating to who is in a portion (e.g., actors, cartoons, or other characters in the portion), what is in a portion (e.g., objects, landscapes, brightness, etc.), where the portion occurs (e.g., a filming location for a video, or a location that the video intends to portray), when the portion occurs (e.g., past, present, or future), and what activities are occurring in the portion (e.g., if a character in the media asset is presently engaged in any activity, such as walking, running, a sport, sleeping, or any other activity). As depicted, characteristics 104 and characteristics 114 are organized into known data structures that are associated with a given portion; however, characteristics 104 and characteristics 114 may also be determined, or supplemented, on-the-fly, by obtaining information about the media asset through any known means (e.g., character recognition, object recognition, natural language processing, and crowd sourced data (e.g., user annotations), and the like).

User profile 150 is a data structure that includes, among other things, activities that are planned by a user who is viewing the media asset. As used herein, the term "activity" refers to any planned or scheduled course of action that a user intends to take. For example, an activity may be a planned trip (or a sub-component thereof, such as a day-long tour within a week-long trip, or attendance at a sporting event during the planned trip). An activity may also be a scheduled event, such as a plan to attend tennis lessons, or a plan to go jogging. An activity may be routine (e.g., a daily jog), or non-routine (e.g., a trip to somewhere exotic, like Antarctica).

User profile 150 includes activity 152 and activity 154. While activity 152 is depicted as an activity learned through a travel booking application, and activity 154 is depicted as an activity entered manually by a user through a calendar application, activity 152 and activity 154 may be any activities. The media guidance application may learn of activity 152 and activity 154, and thus add activity 152 and activity 154 to user profile 150, by querying one or more non-media guidance applications. As used herein, the term "non-media guidance application" refers to any application that does not fit within the scope of the term "media guidance application," as defined below with respect to FIGS. 2-5. Specifically, a non-media guidance application is an application that is used primarily for a purpose other than providing guidance through media. Examples of non-media guidance applications include calendar applications, proprietary applications whose primary purpose is to sell goods and/or services, and the like.

An activity, as described above, may be inferred based on user interactivity with a non-media guidance application. When a user purchases a product, the media guidance application may infer that the user will engage in an activity that requires the product in the near-term. Inferences may be based on data of a knowledge graph that logs associations between products and activities that are associated with those products, as well as places in which those activities may be performed. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

As an example, if a user purchases snorkeling equipment from a retailer, such as Amazon.com, a web retailer, or from Target, a brick-and-mortar retailer, a non-media guidance application may inform the media guidance application of the purchase (e.g., an application associated with the retailer may transmit a message to the media guidance application with information about the purchased product). The media guidance application may then consult a knowledge graph to learn various activities associated with the equipment, such as snorkeling and scuba diving, as well as places in which these activities may occur. The media guidance application may thus provide recommendations to the user when a portion of a media asset includes an activity associated with the product, or a place associated with the product.

The media guidance application may consult a profile of the user to determine whether the user intends to travel to a place associated with a purchased product, or perform an activity associated with the purchased product, in order to strengthen its inference about the activity in which the purchased product is likely to be used. Following from the snorkeling example, if a travel application reflects that the user will be traveling to Hawaii in the near future, the media guidance application may learn from the knowledge graph that Hawaii has a strong association with snorkeling, and may infer that the user intends to snorkel while in Hawaii. Thus, when a portion of a media asset reflects a scene in Hawaii, or a scene relating to snorkeling, the media guidance application may generate for display a recommendation about snorkeling in Hawaii.

In some embodiments, a media guidance application (e.g., executed by control circuitry of user equipment or of a server remote from user equipment) may identify a first plurality of activities a user has planned. Functionality of control circuitry, user equipment, servers, and communications networks are described in further detail below with respect to FIGS. 2-5. The media guidance application may identify the activities by accessing user profile 150, which may be located in memory of the user equipment or of a remote database (as described further below with respect to FIGS. 2-5). As depicted in FIG. 1, the media guidance application may determine that user profile 150 indicates that the user has planned activity 152 and activity 154. As depicted in FIG. 1, the media guidance application may determine that activity 152 indicates that the user has planned a trip to Los Angeles, Calif., from Jan. 1, 2017 through Jan. 16, 2017, and that the user plans to go sky diving while in Los Angeles. The media guidance application may determine that activity 154 indicates that the user has a surfing lesson planned for May 5, 2017, at 2:00 pm, in Jones Beach, N.Y.

As described in the foregoing, the media guidance application may have populated user profile 150 by querying a non-media guidance application, such as an application dedicated to booking travel activities (e.g., Kayak, which is a service for booking car, hotel, and airline reservations), a calendar application, or any other non-media guidance application. Alternatively, or additionally, the media guidance application may proactively query one or more non-media guidance applications for information about activities that the user has planned without referencing user profile 150. For example, the media guidance application may periodically query the non-media guidance applications for new activities that are not reflected on user profile 150.

Additionally, or alternatively, the media guidance application may instruct the non-media guidance applications to push updates to the media guidance application. As an example, if a user plans a new activity using a non-media guidance application, the non-media guidance application may transmit a notification to the media guidance application to inform the media guidance application of the new activity. The media guidance application may responsively update user profile 150 to reflect the new activity. Moreover, in some embodiments, the media guidance application may delete activities from user profile 150 at any point in time, such as the instant the activity occurs, at a predetermined time after the activity occurs, and/or at a user's command. The predetermined time may be set by a user or may be a default setting. The user's command may occur any time, whether or not the activity has occurred yet.

In some embodiments, a non-media guidance application may determine that a plan for an activity is canceled or postponed. The non-media guidance application may be under instructions from the media guidance application to update the media guidance application about the cancellation. The media guidance application may receive such an update, and may reactively adjust or delete an activity entry from user profile 150. In other embodiments, the media guidance application may periodically query the non-media guidance applications to confirm proactively that a planned activity has not been altered, postponed, or canceled.

In some embodiments, the media guidance application may learn which non-media guidance applications should be queried by consulting user profile 150, which may reflect which non-media guidance applications the user interacts with. For example, as a user installs an application on a smartphone or tablet device, the media guidance application may update user profile 150 to indicate that a new non-media guidance application has been installed and should be monitored for activity updates. In some embodiments, the media guidance application may monitor secondary sources for activity updates. For example, the media guidance application may monitor an e-mail application, which is a non-media guidance application, for e-mails that reflect that an activity has been planned, such as a travel itinerary or confirmation. Other secondary sources may be monitored, such as text messages, social messaging communications, and the like.

In some embodiments, the media guidance application may filter, from the first plurality of activities, a second plurality of activities (e.g., activities that are upcoming in the near future). The media guidance application may perform this filtering by first determining which of the first plurality of activities has a corresponding respective time of the plurality of respective times that is within a threshold period of time of a present moment. The media guidance application may obtain the threshold by querying local memory or a remote database for the threshold. The threshold may be set by default settings, by a user, or by an editor of the media guidance application.

In some embodiments, one threshold period of time will globally apply to all activities. For example, the media guidance application may be programmed in a manner that only activities that are within fifteen days from a present moment are considered to be coming up in the near future. Thus, if the present moment is 10:00 pm on Dec. 18, 2016, activity 152 may be deemed to be near to the present moment because it occurs on Jan. 1, 2017, which is less than 15 days away from the present moment. However, activity 154, which does not occur for more than five months from the present moment, will not be deemed to be near to the present moment. In such a case, activity 152 may be added to the second plurality of activities, while activity 154 will not be added to the second plurality of activities, thus resulting in filtering activity 154 out from the first plurality of activities.

In some embodiments, different threshold periods of time will apply to different types of activities. For example, if a user rarely travels, the media guidance application may determine that a user would be excited about a trip that the user has planned for many months from a present moment. As another example, if an activity is routine (e.g., a daily jog is indicated on the user's calendar every morning at 7 am), the media guidance application may determine that the user is unlikely to be excited about the activity until just minutes before the activity begins. Thresholds for different types of activities may be predefined by an editor of the media guidance application, by default, or by a user. The media guidance application may alter the thresholds dynamically over time as it receives feedback. For example, as will be described below, the media guidance application may provide recommendations to the user that relate to the activity if the activity is near enough in time. If the user, however, rarely acts on the recommendation, the media guidance application may reduce the threshold for that type of activity. Similarly, if the user often acts on the recommendation, the media guidance application may increase the threshold for that type of activity.

As an example of how variable thresholds may work, if the user associated with user profile 150 lives in Los Angeles, and the user is a sky diving instructor who sky dives many days out of the year, and the present moment is Dec. 18, 2016, the threshold for an activity of the type "sky diving" may be below 12 days, and thus, activity 152 may not be added to the list. Similarly, if the same user loves surfing, and loves New York, but rarely visits, the threshold for the type of activity of visiting New York, and/or surfing, may be six months, and thus activity 154, which occurs within six months, may be added to the second plurality of activities.

In some embodiments, an activity may be of multiple types. For example, activity 152 may be of the types "sports" (because sky diving is a sport) and "travel" (because it indicates it is a travel booking), and "sky diving". If an activity has multiple types, and thresholds are variable based on type of activity, then each type may contribute to the threshold. For example, the media guidance application may determine the threshold to be a weighted average of a value assigned to each type. As another example, each type may have an amount of time associated with it, and the media guidance application may add each amount of time associated with each type together to form the threshold.

In some embodiments, the media guidance application may identify characteristics of each activity of the second plurality of activities. In some embodiments, the media guidance application may identify the characteristics of each activity by consulting a data structure associated with the activity. For example, activity 152 represents a data structure that details multiple characteristics of a travel booking, such as the fact that activity 152 is a travel booking, the place in which activity 152 will take place (Los Angeles, Calif.), the dates at which activity 152 will take place (Jan. 1, 2017 through Jan. 16, 2017), and other plans that activity 152 includes, such as sky diving. The data structure that activity 152 represents may be populated by the media guidance application extracting each characteristic from information received from a non-media guidance application, such as a travel itinerary. The media guidance application may alternatively, or additionally, learn characteristics about activity 152 by consulting a secondary source, such as a database, that has associations with a given destination. For example, if activity 152 represents a trip to Los Angeles, Calif., the media guidance application may determine that a characteristic of Los Angeles, Calif. is that it has a beach, because Santa Monica beach is a top tourist attraction in Los Angeles.

The media guidance application may identify characteristics of a portion of a media asset that the user is consuming at the present moment, such as a present frame of a movie, or a present scene. For example, portion 102 may be a scene, or an image frame, from the movie Point Break, which stars actor Keanu Reeves. Characteristics 104 may be predetermined characteristics, as stored in local memory or in a remote database. The characteristics may be predetermined based on an editor entering the characteristics (e.g., IMDb, a popular movie database application, may have written up the characteristics, and the media guidance application may retrieve them from IMDb). The characteristics may also be predetermined from a user entering the characteristics (e.g., on a social media site that tags portion 102 with characteristics 104). Characteristics 104 may also be received with portion 102 as metadata in a VBI or auxiliary signal. Alternatively, characteristics 104 may be received from any known alternative source. For example, if the movie Point Break were being played to a user from a DVD, then characteristics 104 may be written onto the DVD and known to the media guidance application from that storage.

In some embodiments, the media guidance application may dynamically determine characteristics 104. For example, the media guidance application may use facial recognition to recognize actors other than Keanu Reeves that may not have been included in a predefined characteristics 104, and may add those actors to characteristics 104. Other means of determining characteristics and adding them to characteristics 104 include performing textual recognition, such as performing textual recognition on a sign to learn that a characteristic of portion 102 is that it is filmed on a specific street. The media guidance application may perform natural language processing on speech, subtitles, and/or closed captioning to learn further characteristics 104 about portion 102, as well as object or image recognition. While characteristics 114 of portion 112 were not discussed in this embodiment, the media guidance application may determine characteristics 114 of portion 112 in any manner described with respect to characteristics 104.

In some embodiments, the media guidance application may compute, for each activity of the second plurality of activities, whether the respective characteristics of each respective activity are relevant to the portion of the media asset based on a comparison between the respective characteristics and the characteristics of the portion of the media asset. In other words, the media guidance application may determine, based on a comparison of characteristics 104 or characteristics 114 to the characteristics of activity 152 or activity 154, whether activity 152 and/or activity 154 is relevant to portion 102 or portion 112.

To perform this computation, the media guidance application may determine, for each respective activity, a respective amount of respective characteristics that match the characteristics of the portion of the media asset. For example, the media guidance application may determine that one of characteristics 104 of portion 102 match the characteristics of activity 152 (namely, "California"). Similarly, the media guidance application may determine that two of characteristics 104 of portion 102 match the characteristics of activity 154 (namely, "beach" and "surfing"). As another example, the media guidance application may determine that four characteristics 114 of portion 112 match the characteristics of activity 152 (namely, "sky diving," "California," "Beach," and "Pacific").

The media guidance application may then compare each respective amount to a threshold, and may determine, based on comparing each respective amount to the threshold, that a respective characteristic has a respective amount that exceeds the threshold. Similar to the time threshold discussed above, the threshold amount of characteristics that need to match may be static, or may vary based on the activity. Moreover, all characteristics of an activity or of a portion need not be treated equally—if the media guidance application detects that a given characteristic is important, or irrelevant, to a user's interest, then that given activity may be given more or less weight, and may count as multiple activities, or may have no weight at all. For example, if the media guidance application determines that a user profile (e.g., user profile 150) indicates that sky diving is very important to the user, when the characteristic "sky diving" is encountered in both an activity and a characteristic of a portion, the media guidance application may treat that encounter as if two matching characteristics are found, or three matching characteristics are found. The amount that a given characteristic is weighted may be programmed by an editor of the media guidance application to be any desired function.

In some embodiments, similar to the notion of weighting characteristics of an activity described above, when comparing each respective amount to a threshold, the media guidance application may determine a plurality of thresholds, where each threshold of the plurality of thresholds corresponds to a respective activity of the second plurality of activities. For example, the media guidance application may consult user profile 150 to determine preferences of the user. The media guidance application may then determine, based on how much a user prefers a given activity, how many characteristics of a portion of a media asset should match that activity to trigger a recommendation. This determination may be a pre-programmed function input by an editor, where the more a user prefers an activity, the lower the threshold becomes. The media guidance application may then compare each respective amount that corresponds to a respective activity to a threshold of the plurality of thresholds that corresponds to the respective activity in order to determine whether to trigger a recommendation.

In response to determining that the respective characteristic has a respective amount that exceeds the threshold, the media guidance application may determine that the respective characteristics for the respective activity to which the respective characteristics correspond are relevant to the portion of the media asset. Thus, activities with a sufficient number of characteristics that match characteristics of a portion of a media asset will be deemed relevant to the portion of the media asset.

In some embodiments, in response to determining that the respective characteristics for a respective activity are relevant to the portion of the media asset, the media guidance application may generate for display a recommendation relating to the respective activity. For example, when generating for display the recommendation, the media guidance application may determine which characteristics of the respective characteristics for the respective activity are relevant to the portion of the media asset (e.g., which characteristics of an activity match the characteristics of the portion), and may access a plurality of candidate recommendations.

As a non-limiting example, characteristics 104, which include six characteristics may be associated with six candidate recommendations, each corresponding to a different one of the six characteristics. As another example, candidate recommendations may be associated with multiple characteristics, and the media guidance application may select a candidate recommendation to generate for display based on the candidate recommendation matching the most relevant characteristics of the activity, or based on having a highest weighted sum of characteristics (as described above, based on user profile 150). The media guidance application may determine, based on comparing the characteristics of the respective activity that are relevant to the portion of the media asset to characteristics corresponding to each candidate recommendation of the plurality of candidate recommendations, a candidate recommendation that best matches the respective activity, and may generate for display the candidate recommendation.

In some embodiments, the media guidance application may determine that a plurality of respective activities have respective characteristics that are relevant to the portion of the media asset. The media guidance application may rank each activity of the plurality of respective activities based on how relevant each activity is with respect to the portion of the media asset (e.g., how many characteristics match, or based on a weighted amount of characteristics that match, the characteristics of the portion). When the media guidance application generates for display the recommendation relating to the respective activity, the media guidance application may generate for display a recommendation for a highest ranked activity.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
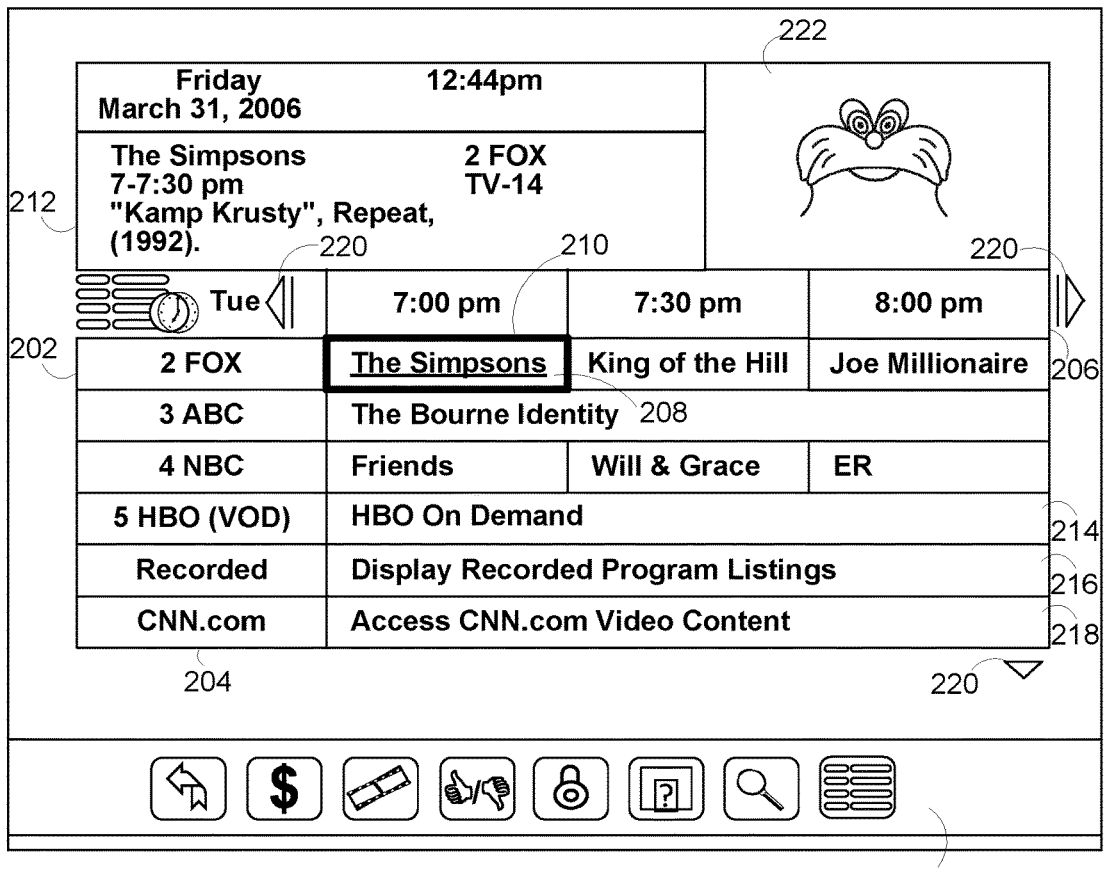
FIG. 2 shows an illustrative embodiment of a display screen that may be used to provide media guidance application listings and other media guidance information, in accordance with some embodiments of the disclosure.
Figure 3:
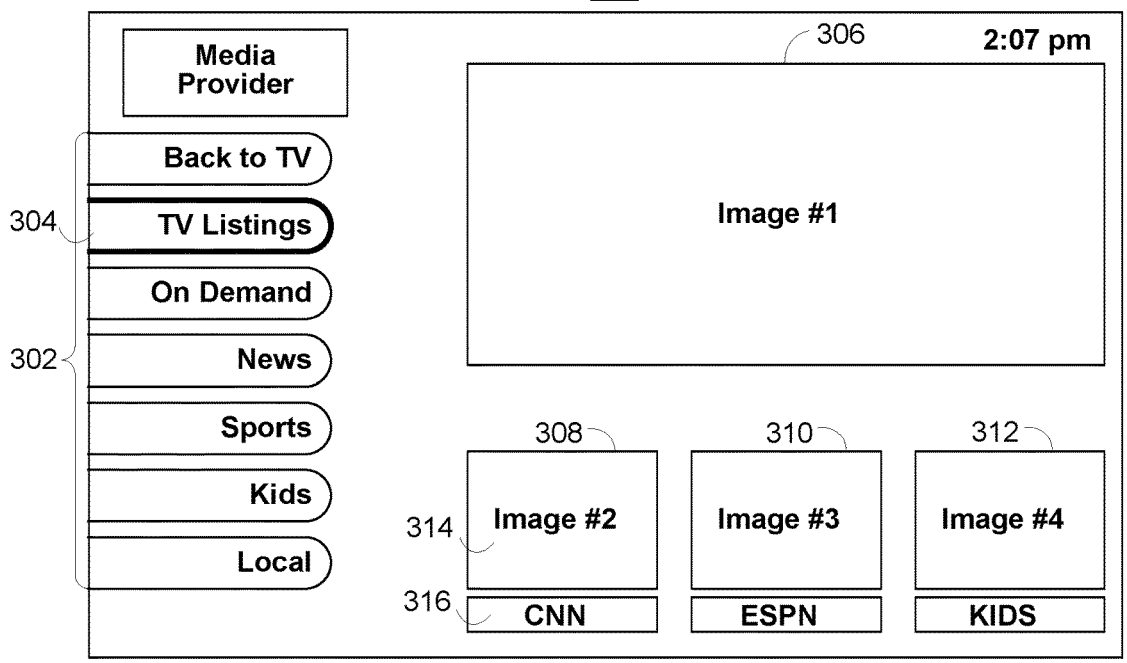
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
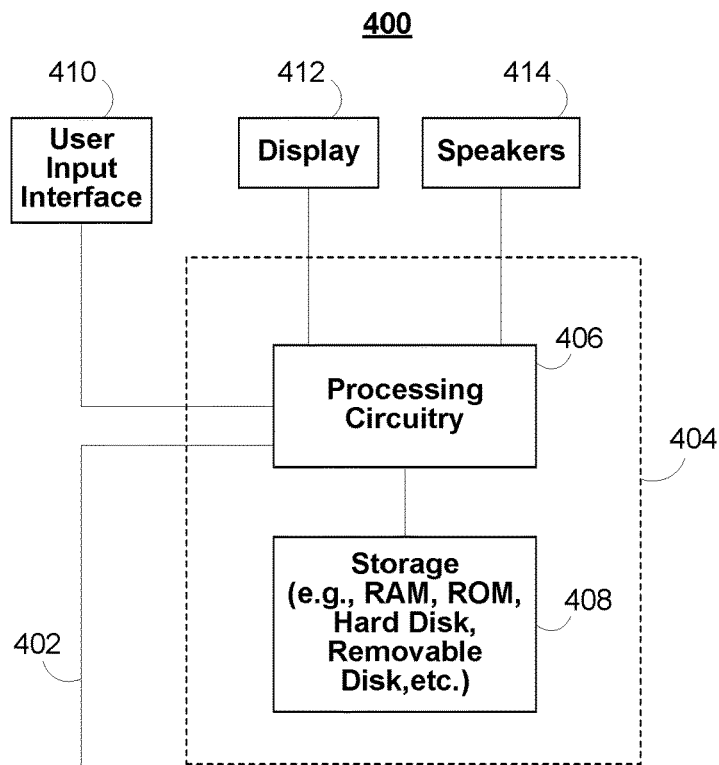
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
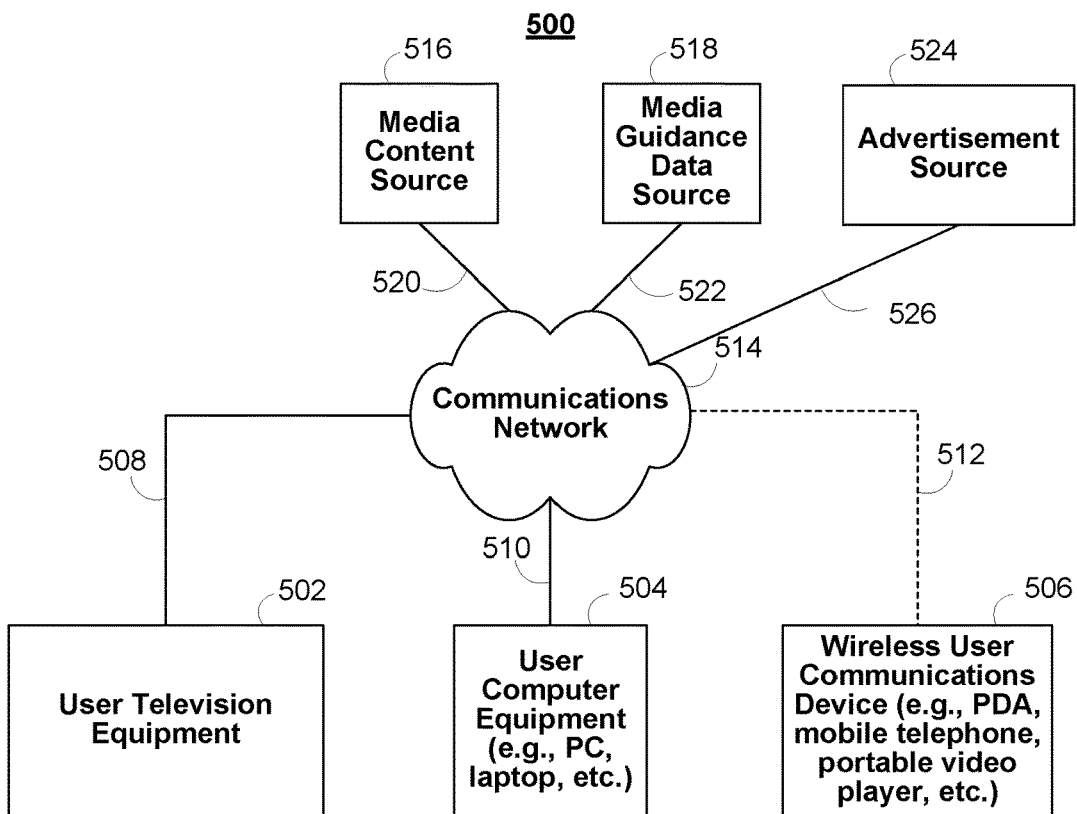
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source 524 may target advertisements based on the demographics of users known to view a particular show (e.g., teenagers viewing a reality show). As yet another example, advertisement source 524 may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
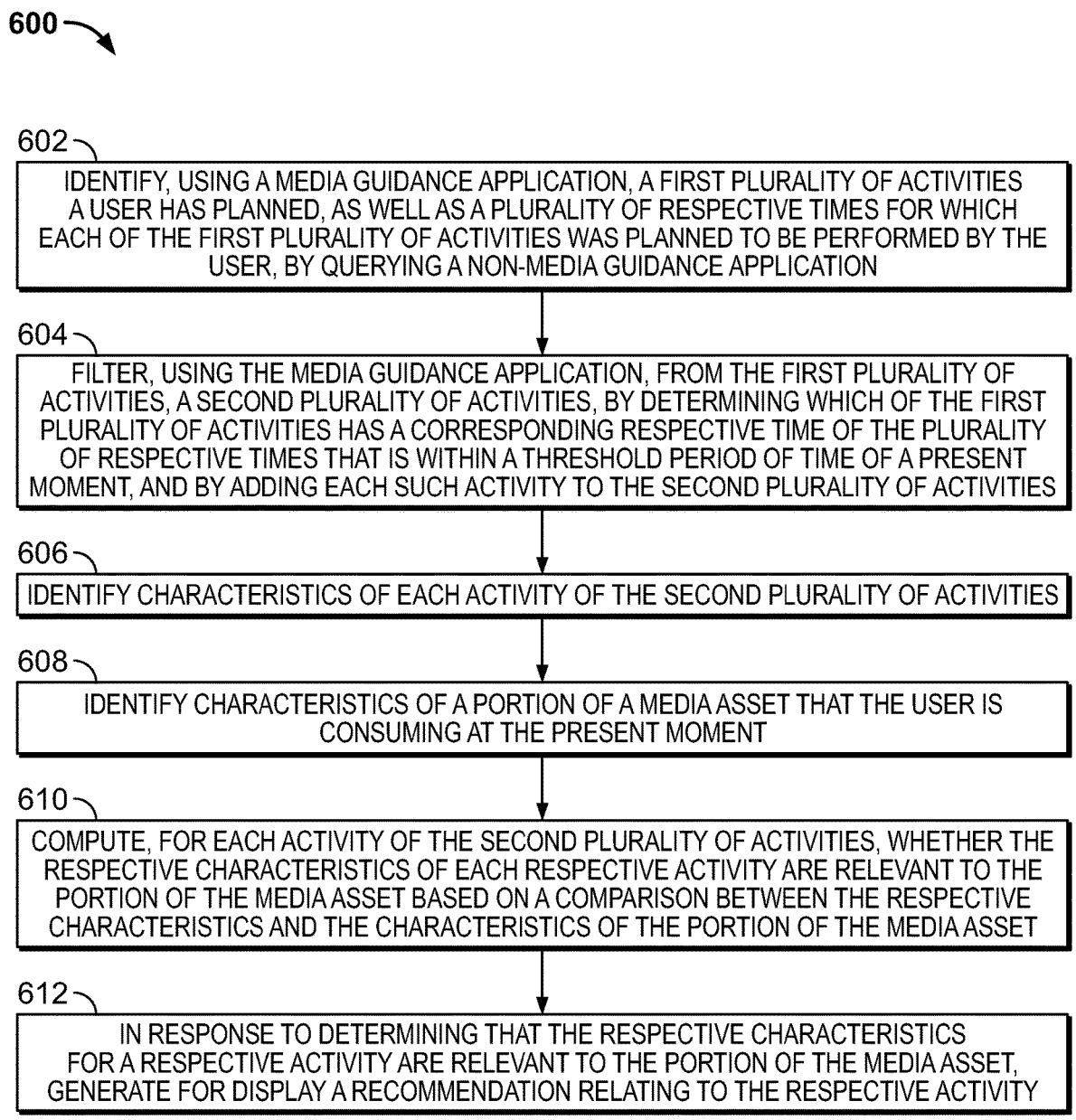
FIG. 6 depicts an illustrative flowchart of a process for generating for display a recommendation relating to a planned activity of a user that is relevant to a displayed portion of a media asset, in accordance with some embodiments of the disclosure.

FIG. 6 depicts an illustrative flowchart of a process for generating for display a recommendation relating to a planned activity of a user that is relevant to a displayed portion of a media asset, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100 and/or 110, each of which may have any or all of the functionality of user television equipment 502, user computer equipment 504, and/or wireless communications device 506), or of a remote server separated from the user equipment by way of communications network 514.

Process 600 begins at 602, where control circuitry 404 may identify, using a media guidance application, a first plurality of activities a user has planned, as well as a first plurality of respective times for which each of the first plurality of activities was planned to be performed by the user, by querying a non-media guidance application. The non-media guidance application may be stored on user equipment 100 or user equipment 110 (e.g., in storage 408) or may be stored remote from the user equipment (e.g., at a database such as media content source 516). The query may be transmitted over communications network 514. Performing the identifying of 602 is described in great detail with respect to FIG. 1 above, and such description is equally applicable to 602.

Process 600 continues to 604, where control circuitry 404 may filter, from the first plurality of activities, a second plurality of activities, by determining which of the first plurality of activities has a corresponding respective time of the plurality of respective times that is within a threshold period of time of a present moment, and by adding each such activity to the second plurality of activities. Control circuitry 404 may cause the second plurality of activities to be maintained at storage 408, or at memory of a remote database such as media guidance data source 518. Manners of performing the filtering and adding of 604 are described above with respect to FIG. 1 above, and such description is equally applicable to 604. Moreover, process 700 of FIG. 7 further describes how the filtering and adding of 604 may be performed.

Process 600 continues to 606, where control circuitry 404 may identify characteristics of each activity of the second plurality of activities, and then to 608, where control circuitry 404 may identify characteristics of a portion of a media asset that the user is consuming at the present moment. The manner in which control circuitry 404 performs the identification of 606 and 608 is described above with respect to FIG. 1, and such description is equally applicable to 606 and 608. Characteristics of the portion of the media asset may be retrieved from, e.g., media guidance data source 518 or any other database, accessible to control circuitry 404 by way of communications network 514.

Process 600 continues to 610, where control circuitry 404 may compute, for each activity of the second plurality of activities, whether the respective characteristics of each respective activity are relevant to the portion of the media asset based on a comparison between the respective characteristics and the characteristics of the portion of the media asset. The manner in which control circuitry 404 performs the computation of 610 is described above with respect to FIG. 1, and such description is equally applicable to 610.

Process 600 concludes at 612, where, in response to determining that the respective characteristics for a respective activity are relevant to the portion of the media asset, control circuitry 404 generates for display a recommendation relating to the respective activity. Control circuitry 404 may retrieve the recommendation from media content source 516, and may cause the recommendation to be displayed on display 412 or output through speakers 414. The manner in which control circuitry 404 performs the generating for display of 612 is described above with respect to FIG. 1, and such description is equally applicable to 612. Moreover, process 800 of FIG. 8, described below, further describes the manner in which control circuitry 404 selects a recommendation and generates for display the recommendation.

Figure 7:
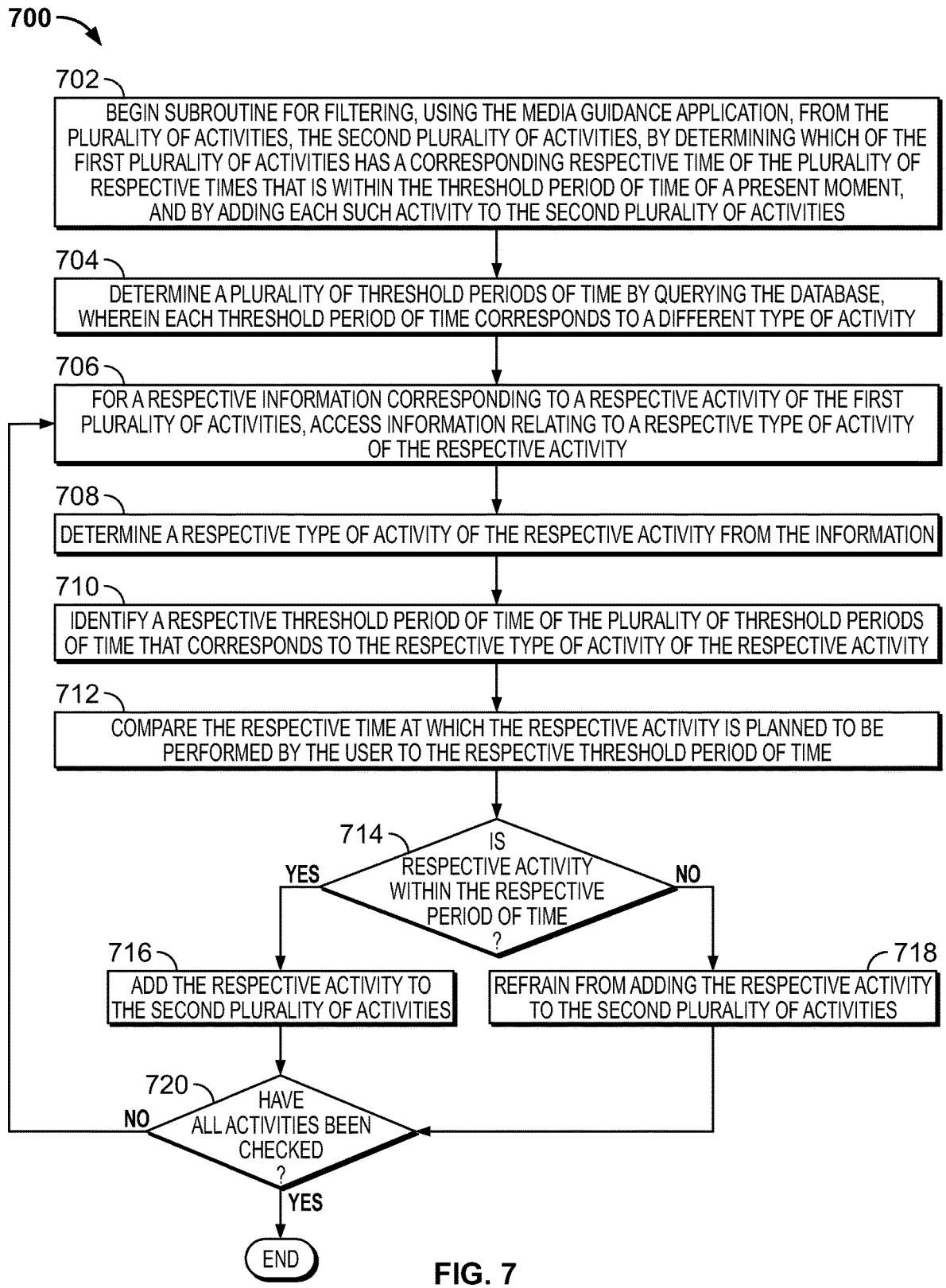
FIG. 7 depicts an illustrative flowchart of a process for determining which activities a user has planned are sufficiently close in time to form a basis for a recommendation, in accordance with some embodiments of the disclosure.

FIG. 7 depicts an illustrative flowchart of a process for determining which activities a user has planned are sufficiently close in time to form a basis for a recommendation, in accordance with some embodiments of the disclosure. Process 700 may be executed by control circuitry 404 (e.g., in a manner instructed to control circuitry 404 by the media guidance application). Control circuitry 404 may be part of user equipment (e.g., user equipment 100 and/or 110, each of which may have any or all of the functionality of user television equipment 502, user computer equipment 504, and/or wireless communications device 506), or of a remote server separated from the user equipment by way of communications network 514.

Process 700 begins at 702, where control circuitry 404 may begin a subroutine for filtering, using the media guidance application, from the plurality of activities, the second plurality of activities, by determining which of the first plurality of activities has a corresponding respective time of the plurality of respective times that is within the threshold period of time of a present moment, and by adding each such activity to the second plurality of activities. As an example, this subroutine may be a subroutine for control circuitry 404 to execute 604 of process 600.

At 704, control circuitry 404 may determine a plurality of threshold periods of time by querying the database, wherein each threshold period of time corresponds to a different type of activity. The database may be, for example, media guidance data source 518, which control circuitry 404 may query by transmitting a request through communications network 514. The manner in which control circuitry 404 performs the determining of a plurality of threshold periods of time is described above with respect to FIG. 1, and such description is equally applicable to 704.

At 706, control circuitry 404 may, for a respective information corresponding to a respective activity of the first plurality of activities, access information relating to a respective type of activity of the respective activity (e.g., from media guidance data source 518 by way of communications network 514). At 708, control circuitry 404 may determine a respective type of activity of the respective activity from the information, and at 710, control circuitry 404 may identify a respective threshold period of time of the plurality of threshold periods of time that corresponds to the respective type of activity of the respective activity. The manner in which control circuitry 404 performs the elements of 706, 708, and 710 is described above with respect to FIG. 1, and such description is equally applicable to 706, 708, and 710.

At 712, control circuitry 404 may compare the respective time at which the respective activity is planned to be performed by the user to the respective threshold period of time. At 714, control circuitry 404 may determine, based on the comparison, whether the respective activity is within the respective period of time. If the respective activity is in fact within the respective period of time, process 700 continues to 716, where control circuitry 404 adds the respective activity to the second plurality of activities. If the respective period is not within the respective period of time, process 700 proceeds to 718, where control circuitry 404 refrains from adding the respective activity to the second plurality of activities. The second plurality of activities may be stored in storage 408 or at a remote database such as media guidance data source 518. At 720, control circuitry 404 determines whether all activities have been checked, and if not, process 700 reverts to 706 for each consecutive activity until the last activity has been checked, in which case process 700 ends. The manner in which control circuitry 404 performs the elements of 712-720 is described above with respect to FIG. 1, and such description is equally applicable to 712-720.

Figure 8:
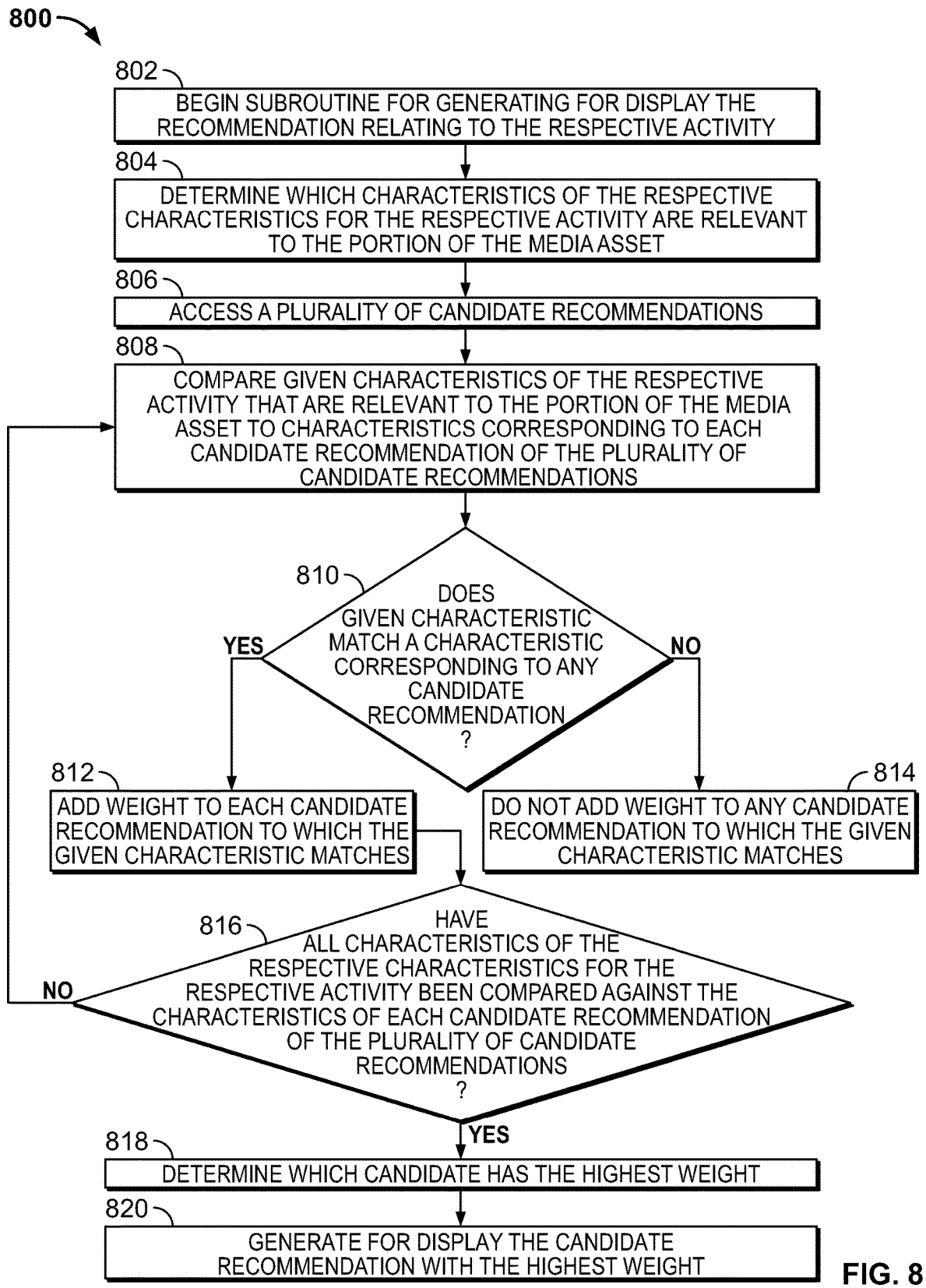
FIG. 8 depicts an illustrative flowchart of a process for determining which candidate recommendation of a plurality of candidate recommendations that relate to a planned activity of a user to generate for display to the user, in accordance with some embodiments of the disclosure.

FIG. 8 depicts an illustrative flowchart of a process for determining which candidate recommendation of a plurality of candidate recommendations that relate to a planned activity of a user to generate for display to the user, in accordance with some embodiments of the disclosure. Process 800 may be executed by control circuitry 404 (e.g., in a manner instructed to control circuitry 404 by the media guidance application). Control circuitry 404 may be part of user equipment (e.g., user equipment 100 and/or 110, each of which may have any or all of the functionality of user television equipment 502, user computer equipment 504, and/or wireless communications device 506), or of a remote server separated from the user equipment by way of communications network 514.

Process 800 begins at 802, where control circuitry 404 may begin a subroutine for generating for display the recommendation relating to the respective activity. As an example, this subroutine may be a subroutine for control circuitry 404 to execute 612 of process 600. At 804, control circuitry 404 may determine which characteristics of the respective characteristics for the respective activity are relevant to the portion of the media asset. The manner in which control circuitry 404 determines relevance of characteristics to portions is described above with respect to FIG. 1, and such description is equally applicable to 804.

At 806, control circuitry 404 accesses a plurality of candidate recommendations (e.g., from storage 408 or media guidance data source 518 by way of communications network 514). At 808, control circuitry 404 compares a given characteristic of the respective activity that is relevant to the portion of the media asset to characteristics corresponding to each candidate recommendation of the plurality of candidate recommendations. The manner in which control circuitry 404 performs this comparison is described above with respect to FIG. 1, and such description is equally applicable to 808.

At 810, control circuitry 404 determines whether the given characteristic matches a characteristic corresponding to any candidate recommendation. If there is in fact a match, process 810 continues to 812, where control circuitry 404 adds weight to each candidate recommendation to which the given characteristic matches. If there is not a match, process 800 continues to 814 from 810, where control circuitry 404 does not add weight to any candidate recommendation.

From either 812 or 814, process 800 continues to 816, where control circuitry 404 determines whether all characteristics of the respective characteristics for the respective activity been compared against the characteristics of each candidate recommendation of the plurality of candidate recommendations. If not, process 800 reverts to 808. If so, process 800 proceeds from 816 to 818, where control circuitry 404 determines which candidate has the highest weight. Process 800 continues to 820, where control circuitry 404 generates for display the candidate recommendation with the highest weight.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining planned activities of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of the home security application, such as volume settings or time restriction settings, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for generating media content recommendations, the method comprising:

receiving a plurality of activities that a user plans to participate in, wherein each activity of the plurality of activities occurs at a different geographic location and time;

retrieving a first characteristic of an activity of the received plurality of activities;

retrieving a second characteristic of a media asset that the user is currently consuming;

determining whether the first characteristic matches the second characteristic;

in response to determining that the first characteristic matches the second characteristic:

accessing a plurality of media content recommendations;

comparing the first characteristic with characteristics corresponding to each media content recommendation of the plurality of media content recommendations;

determining, based on the comparing, a media content recommendation that matches the activity of the received plurality of activities; and generating for display the media content recommendation.

2. The method of claim 1, wherein receiving the plurality of activities that a user plans to participate in further comprises:

identifying a plurality of non-media guidance applications that are associated with a user;

querying each non-media guidance application of the plurality of non-media guidance applications for information relating to activities the user has planned to participate in;

receiving, in response to the querying, information about an activity of the plurality of activities that the user has planned to participate in; and adding the information to the received plurality of activities.

3. The method of claim 2 wherein querying each non-media guidance application comprises querying at least one of planning or conducting a travel activity, attendance at an event, content browsing, or messaging communications.

4. The method of claim 1, wherein retrieving the second characteristic of the media asset that the user is currently consuming further comprises receiving a characteristic of a portion of the media asset.

5. The method of claim 4, wherein determining whether the first characteristic matches the second characteristic further comprises determining whether the first characteristic matches the characteristic of the portion of the media asset.

6. The method of claim 1, wherein the first characteristic includes a first plurality of characteristics and the second characteristic includes a second plurality of characteristics, and wherein determining whether the first characteristic matches the second characteristic further comprises:

determining a number of characteristics of the first plurality of characteristics that match a characteristic of the second plurality of characteristics;

comparing the number to a threshold;

determining, based on comparing the number to the threshold, that the number exceeds the threshold; and in response to determining that the number exceeds the threshold, determining that the first characteristic matches the second characteristic.

7. The method of claim 6, wherein comparing the number to a threshold further comprises:

determining a plurality of thresholds, wherein each threshold of the plurality of thresholds corresponds to a respective activity of the received plurality of activities; and comparing the number that corresponds to a respective activity to a threshold of the plurality of thresholds that corresponds to the respective activity.

8. The method of claim 1, further comprising:

determining that a plurality of respective activities of the received plurality of activities have respective characteristics that match the second characteristic; and ranking each activity of the plurality of respective activities of the received plurality of activities based on a number of the characteristics of each activity of the plurality of respective activities of the received plurality of activities that match the second characteristic, wherein generating for display the media content recommendation comprises generating for display a media content recommendation for a highest ranked activity.

9. The method of claim 1 wherein determining, based on the comparing, a media content recommendation that matches the activity of the received plurality of activities further comprises matching the media content recommendation to the activity of the received plurality of activates according to a geographic location.

10. A system for generating media content recommendations, the system comprising:

control circuitry configured to:

receive a plurality of activities that a user plans to participate in, wherein each activity of the plurality of activities occurs at a different geographic location and time;

retrieve a first characteristic of an activity of the received plurality of activities;

retrieve a second characteristic of a media asset that the user is currently consuming;

determine whether the first characteristic matches the second characteristic;

in response to determining that the first characteristic matches the second characteristic:

access a plurality of media content recommendations;

compare the first characteristic with characteristics corresponding to each media content recommendation of the plurality of media content recommendations;

determine, based on the comparing, a media content recommendation that matches the activity of the received plurality of activities; and generate for display the media content recommendation.

11. The system of claim 10, wherein, when receiving the plurality of activities that a user plans to participate in, the control circuitry is further configured to:

identify a plurality of non-media guidance applications that are associated with a user;

query each non-media guidance application of the plurality of non-media guidance applications for information relating to activities the user has planned to participate in;

receive, in response to the querying, information about an activity of the plurality of activities that the user has planned to participate in; and add the information to the received plurality of activities.

12. The system of claim 11 wherein querying each non-media guidance application comprises querying at least one of planning or conducting a travel activity, attendance at an event, content browsing, or messaging communications.

13. The system of claim 10, wherein, when retrieving the second characteristic of the media asset that the user is currently consuming, the control circuitry is further configured to receive a characteristic of a portion of the media asset.

14. The system of claim 13, wherein, when determining whether the first characteristic matches the second characteristic, the control circuitry is further configured to determine whether the first characteristic matches the characteristic of the portion of the media asset.

15. The system of claim 10, wherein the first characteristic includes a first plurality of characteristics and the second characteristic includes a second plurality of characteristics, and wherein, when determining whether the first characteristic matches the second characteristic, the control circuitry is further configured to:
  determine a number of characteristics of the first plurality of characteristics that match a characteristic of the second plurality of characteristics;
  compare the number to a threshold;
  determine, based on comparing the number to the threshold, that the number exceeds the threshold; and
  in response to determining that the number exceeds the threshold, determine that the first characteristic matches the second characteristic.

16. The system of claim 15, wherein, when comparing the number to a threshold, the control circuitry is further configured to:
  determine a plurality of thresholds, wherein each threshold of the plurality of thresholds corresponds to a respective activity of the received plurality of activities; and
  compare the number that corresponds to a respective activity to a threshold of the plurality of thresholds that corresponds to the respective activity.

17. The system of claim 10, wherein the control circuitry is further configured to:
  determine that a plurality of respective activities of the received plurality of activities have respective characteristics that match the second characteristic; and
  rank each activity of the plurality of respective activities of the received plurality of activities based on a number of the characteristics of each activity of the plurality of respective activities of the received plurality of activities that match the second characteristic,
  wherein, when generating for display the media content recommendation, the control circuitry is further configured to generate for display a media content recommendation for a highest ranked activity.

18. The system of claim 10 wherein when determining, based on the comparing, a media content recommendation that matches the activity of the received plurality of activities the control circuitry is further configured to match the media content recommendation to the activity of the received plurality of activates according to a geographic location.

* * * * *